United States Patent [19]
McHenry et al.

[11] Patent Number: 5,273,845
[45] Date of Patent: Dec. 28, 1993

[54] TERMINAL STRUCTURE AND SEAL

[75] Inventors: Edwin J. McHenry, Gilbert; Christopher A. Baker, Tempe, both of Ariz.

[73] Assignee: Acme Electric Corporation, East Aurora, N.Y.

[21] Appl. No.: 931,727

[22] Filed: Aug. 18, 1992

[51] Int. Cl.$^5$ .............................................. H01M 2/30
[52] U.S. Cl. ..................................... 429/180; 429/183
[58] Field of Search .......................... 429/180, 183, 181

[56] References Cited

U.S. PATENT DOCUMENTS

| | | | |
|---|---|---|---|
| 1,325,338 | 12/1919 | Sturges | 429/180 X |
| 1,376,905 | 5/1921 | Sturges | 429/183 X |
| 2,557,615 | 6/1951 | Schneider | 429/183 |
| 3,109,055 | 10/1963 | Ziegler . | |
| 3,433,681 | 3/1969 | Jammet . | |
| 3,652,340 | 3/1972 | Sharpe et al. . | |
| 3,968,022 | 7/1976 | Eng et al. . | |
| 3,981,759 | 9/1976 | Summo . | |
| 4,047,790 | 9/1977 | Carino | 429/181 X |
| 4,075,368 | 2/1978 | Salamon et al. . | |
| 4,156,756 | 5/1979 | Green | 429/183 X |
| 4,164,609 | 8/1979 | Jensen . | |
| 4,212,934 | 7/1980 | Salamon . | |
| 4,495,260 | 1/1985 | Hardigg et al. . | |
| 4,559,283 | 12/1985 | Kruger et al. . | |
| 4,598,466 | 7/1986 | Arenas et al. . | |
| 4,879,191 | 11/1989 | Sindorf . | |

OTHER PUBLICATIONS

McHenry, E. J. and Hubbauer, P., "Hermetic Compression Seals for Alkaline Batteries", *Electrochemical Science and Technology*, vol. 119, No. 5, pp. 564–568 (May, 1972).

*Primary Examiner*—Stephen Kalafut
*Attorney, Agent, or Firm*—Pearne, Gordon, McCoy & Granger

[57] ABSTRACT

A terminal structure and seal for an electrochemical cell includes a terminal post inside a plastic tubular member which is inside a metal barrel. The plastic tubular member is unitary with the plastic cover and a reinforcing boss on the cover is annular and an annular stabilizing flange unitary with the metal barrel is embedded in this reinforcing boss. The metal barrel is separated from the interior of the electrochemical cell so that the metal barrel need not be resistant to the electrolyte and so that there is no potential leakage path between internal threads on the metal barrel and external threads on the plastic tubular member. The foregoing Abstract is merely a resume of general applications, is not a complete discussion of all principles of operation or applications, and is not to be construed as a limitation on the scope of the claimed subject matter.

19 Claims, 1 Drawing Sheet

TERMINAL STRUCTURE AND SEAL

BACKGROUND OF THE INVENTION

Terminals for electrical cells or batteries extend from the interior to the exterior of the battery case and need to be sealed against leakage of gas or electrolyte. A hermetic seal is usually required due to temperature and pressure cycling and other variables. A Ziegler seal was originally proposed for submarine cable repeaters, as shown in U.S. Pat. No. 3,109,055. This type of seal has also been proposed for electrochemical cells, but these were with a metallic case and cover for the electrochemical cell.

SUMMARY OF THE INVENTION

A terminal structure and seal disclosed for a terminal of an electrical cell or battery which has a case and comprises the combination of a unitary plastic tubular member extending generally perpendicularly of the plastic cover of the battery case, a metal terminal post inside the tubular member, a metal barrel member surrounding and radially inwardly compressed on said tubular member to cause said tubular member to be radially inwardly compressed to seal with said terminal post, and a radially outwardly extending stabilizing flange on one of said metal barrel member and said terminal post engaging said plastic cover.

The invention further is directed to a terminal structure for an electrical cell or battery having a case with a plastic cover, a plastic tubular member unitary with the cover and having a longitudinal axis and extending generally perpendicularly of said plastic cover, a metal terminal post within the tubular member and a malleable barrel member surrounding and radially inwardly compressed upon said tubular member to cause said tubular member to be radially inwardly compressed to seal with said terminal post, and a radially outwardly extending stabilizing flange generally perpendicular to said axis and engaging the cover to resist any thrust on said terminal structure in directions generally perpendicular to said axis.

An object of the invention is to obtain a threaded compression seal in a plastic case and cover.

Another object of the invention is to provide a terminal seal wherein a potential leakage path along the threaded barrel is eliminated.

Another object of the invention is to eliminate brazing or welding of the metal barrel to a metal cover.

Another object of the invention is to have a construction wherein the material of the barrel need not be resistant to the electrolyte within the cell.

Other objects and a fuller understanding of the invention may be had by referring to the following description and claims, taken in conjunction with the accompanying drawing.

DESCRIPTION OF THE PREFERRED EMBODIMENT

Figure 1:
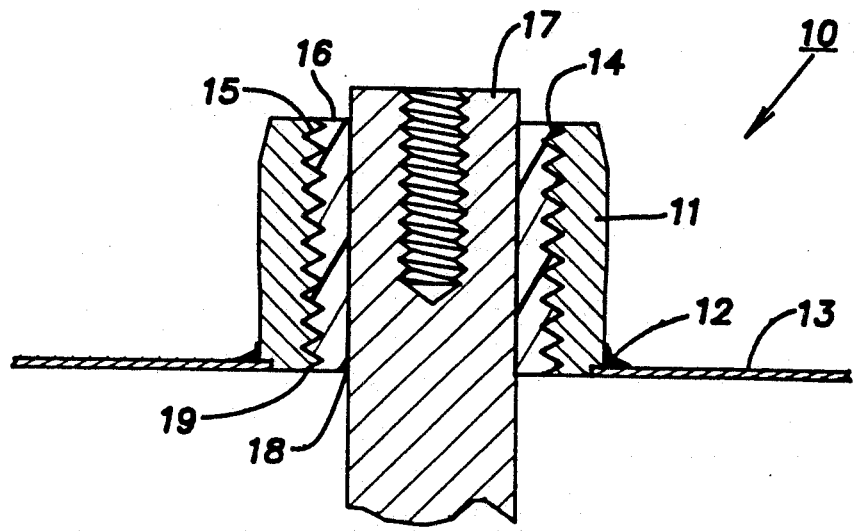
FIG. 1 is a cross-section of a construction known in the prior art.

FIG. 1 of the drawing shows a prior art terminal 10 with a metal barrel 11 welded or brazed at 12 to a metal cover 13 of an electrochemical cell. This metal cover in turn was welded or brazed to the remainder of the metal case, not shown. Internal threads 14 on the metal barrel meshed with external threads 15 on a plastic bushing 16. A metal terminal post 17 extended from the interior to the exterior of the cell case so as to make external electrical connection possible to this cell or battery. This construction required the metal barrel 11 to be brazed or welded into the cover so that it is electrically shorted to the lid. The metal barrel 11 was radially inwardly compressed so that the plastic bushing 16 was also radially inwardly compressed to hermetically seal against the terminal post 17. In this construction there is a potential leakage path 18 between the plastic bushing and the terminal post and there is another potential leakage path 19 along the intermeshing threads 14, 15. Typical threads fit well along the sides but it is difficult to make a tight seal at the root and crest of the threads. In fact the long spiral path between the root and crest of intermeshing threads has long been used as a long, flame-quenching path in explosion-proof electrical enclosures. The metal barrel when radially compressed will spring back slightly after the compression force is released, and this makes it possible that the second leakage path 19 will not maintain a hermetic seal.

Figure 2:
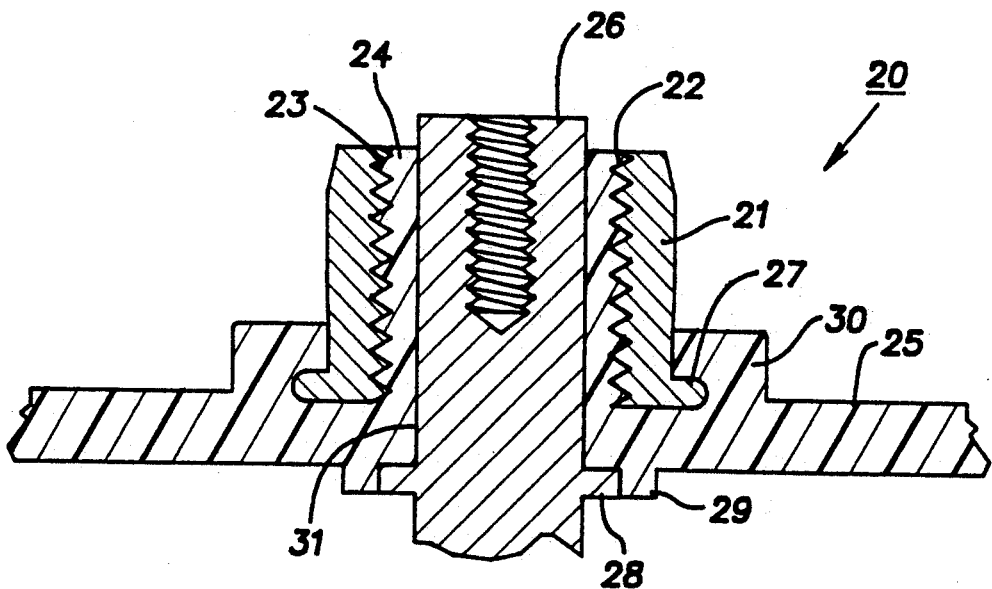
FIG. 2 is a cross-section of a terminal structure and seal according to the present invention.

FIG. 2 shows a terminal structure and seal 20 of the present invention which includes a metal barrel 21 of a malleable metal, for example nickel, stainless steel or nickel plated steel. Alternatively, many other metals may be used. This metal barrel has internal grooves or as shown has internal threads to interengage external annular grooves or external threads 23 of a plastic tubular member 24 which is unitary with a plastic cover 25 which is hermetically sealed to a plastic case, not shown, of the electrochemical cell or battery. A terminal post 26 of metal is within the plastic tubular member 24 and extends from the exterior to the interior of the electrochemical cell. The metal barrel member 21 is radially inwardly compressed upon the plastic tubular member 24 so that it in turn is radially inwardly compressed on the terminal post 26 to make a hermetic seal therewith.

A reinforcing and stabilizing flange 27, 28 is provided on one of the metal barrel member 21 and terminal post 26, and as shown in FIG. 2, flange 27 is preferably unitary with the metal barrel 21, and flange 28, as an alternative is unitary with post 26. This stabilizing flange is embedded in the plastic cover 25 and preferably at an annular reinforcing boss 30 for flange 27 and boss 29 for flange 28, each of which is unitary with the cover 25. This helps stabilize the entire terminal against bending out of the perpendicular relative to the cover 25 and also reduces the stress at the base of the plastic tubular member 24 where it joins the cover 25. The flange 27 or 28 is preferably annular to resist bending stress in all directions parallel to the cover 25. The threads or annular grooves 22, 23 resist longitudinal extrusion of the plastic tubular member 24 during the radially inward compression of the metal barrel 21 by a plurality of dies. This ensures a good seal against leakage along a potential leakage path 31. The terminal post 26 may be included when the cover is molded or may be inserted later during cell assembly. The metal barrel 21 is molded into the plastic cover 25 of the cell. In this construction, as contrasted with the prior art of FIG. 1, there is no leakage path along the threads 22, 23 because the interior end of the metal barrel 21 is completely separated from the interior of the cell, thus no electrolyte or gas may escape along these threads.

The present invention has a number of advantages namely: 1) It allows the threaded compression seal to be used on a plastic case. 2) The potential leakage path along the threaded barrel as in the prior art leakage path 19 is eliminated. 3) Brazing or welding of the barrel to the cover 13 is eliminated. 4) The material of the barrel 21 need not be resistant to the electrolyte within the cell.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A terminal seal for a terminal of an electrical cell or battery having a case comprising, in combination:
   a unitary plastic tubular member extending generally perpendicularly of the plastic cover of the battery case;
   a metal terminal post inside said tubular member;
   a metal barrel member surrounding and radially inwardly compressed on said tubular member to cause said tubular member to be radially inwardly compressed to seal with said terminal post; and
   a radially outwardly extending stabilizing flange on said metal barrel member engaging said plastic cover.

2. A terminal seal as set forth in claim 1, including a reinforcing boss on the battery cover unitary with the plastic cover.

3. A terminal seal as set forth in claim 2, wherein said stabilizing flange is at least partially within said reinforcing boss.

4. A terminal seal as set forth in claim 1, wherein said stabilizing flange is near an inner end of said barrel member.

5. A terminal seal as set forth in claim 4, including said stabilizing flange being separated from the interior of the case by said case cover.

6. A terminal seal as set forth in claim 4, including a unitary reinforcing boss around said terminal post in said plastic cover; and
   said stabilizing flange embedded in said reinforcing boss.

7. A terminal seal as set forth in claim 1, wherein said case is a non-conducting plastic.

8. A terminal seal as set forth in claim 1, wherein said barrel member is annular.

9. A terminal seal as set forth in claim 2, wherein said reinforcing boss is annular around said terminal post.

10. A terminal seal as set forth in claim 1, including a threaded connection between said plastic tubular member and said barrel member.

11. A terminal seal as set forth in claim 1, wherein said stabilizing flange is annular.

12. A terminal seal as set forth in claim 1, wherein said stabilizing flange is on the interior end of said barrel member to resist any thrust on said terminal post.

13. A terminal seal as set forth in claim 1, wherein said stabilizing flange is embedded in the plastic material of the case cover to resist bending of said terminal post and to resist stress at the base of said plastic tubular member.

14. A terminal seal as set forth in claim 1, wherein said plastic tubular member extends externally of said plastic cover.

15. A terminal structure for an electrical cell or battery having a case, comprising, in combination:
   a plastic cover for the case;
   a plastic tubular member unitary with said cover and having a longitudinal axis and extending generally perpendicularly of said plastic cover;
   a metal terminal post within said tubular member;
   a malleable barrel member surrounding and radially inwardly compressed upon said tubular member to cause said tubular member to be radially inwardly compressed to seal with said terminal post; and
   a radially outwardly extending stabilizing flange on one of said malleable barrel member and said terminal post generally perpendicular to said axis and engaging said cover to resist any thrust on said terminal structure in directions generally perpendicular to said axis. resist any thrust on said terminal structure in directions generally perpendicular to said axis.

16. A terminal structure as set forth in claim 15, wherein said stabilizing flange is embedded in said cover.

17. A terminal structure as set forth in claim 15, including a unitary plastic reinforcing boss on said plastic cover; and
   said stabilizing flange being embedded in said reinforcing boss.

18. A terminal structure as set forth in claim 15, wherein said barrel member is separated from the electrolyte in the case by part of said cover.

19. A terminal structure as set forth in claim 15, wherein said stabilizing flange is near an inner end of said barrel member.

* * * * *

UNITED STATES PATENT AND TRADEMARK OFFICE
CERTIFICATE OF CORRECTION

PATENT NO.  : 5,273,845
DATED       : December 28, 1993
INVENTOR(S) : Edwin J. McHenry and Christopher A. Baker It is certified that error appears in the above-identified patent and that said Letters Patent is hereby corrected as shown below:

Column 4, Claim 12, line 3, delete "any thrust on" and insert --bending of--.

Signed and Sealed this

Twenty-eighth Day of June, 1994

Attest:

BRUCE LEHMAN

Attesting Officer        Commissioner of Patents and Trademarks